United States Patent
Johannesson

[19]
[11] Patent Number: 6,106,151
[45] Date of Patent: Aug. 22, 2000

[54] SENSOR FOR MEASURING ROTATIONAL SPEED AND TEMPERATURE

[75] Inventor: Stig-Erik Johannesson, Kungälv, Sweden

[73] Assignee: Volvo Lastvagnar AB, Gothenburg, Sweden

[21] Appl. No.: 09/242,711

[22] PCT Filed: Aug. 18, 1997

[86] PCT No.: PCT/SE97/01357

§ 371 Date: Mar. 30, 1999

§ 102(e) Date: Mar. 30, 1999

[87] PCT Pub. No.: WO98/08063

PCT Pub. Date: Feb. 26, 1998

[30] Foreign Application Priority Data

Aug. 23, 1996 [SE] Sweden ................................ 9603065

[51] Int. Cl.[7] ....................................................... G01P 3/48
[52] U.S. Cl. ............................................ 374/142; 324/166
[58] Field of Search ............................ 73/493, 494, 509; 324/207.14, 166, 174; 374/142

[56] References Cited

U.S. PATENT DOCUMENTS

| 4,659,235 | 4/1987 | Gilmore, Jr. et al. | 374/143 |
| 5,880,584 | 3/1999 | Arai et al. | 324/166 |

FOREIGN PATENT DOCUMENTS

| 0 278 554 | 8/1988 | European Pat. Off. . |
| 31 08 242 | 11/1982 | Germany . |
| 44 31 045 | 3/1996 | Germany . |
| 2 070 776 | 9/1981 | United Kingdom . |

*Primary Examiner*—John E. Chapman
*Attorney, Agent, or Firm*—Young & Thompson

[57] ABSTRACT

The invention relates to a sensor arranged in a casing which is partly filled with a fluid (2) and which comprises a rotatable shaft (3) situated in the casing (1), where the sensor comprises a revolution counter sensor (6) for measuring the speed of revolution of the shaft (3) and on the other hand a temperature sensor (7) for measuring the temperature of the fluid (2). The revolution counter sensor (6) and the temperature sensor (7) form a unit which is situated in the casing (1) and above the surface of the fluid (2).

13 Claims, 2 Drawing Sheets

SENSOR FOR MEASURING ROTATIONAL SPEED AND TEMPERATURE

BACKGROUND OF THE INVENTION

The present invention relates to a sensor arranged in a casing which is partly filled with a fluid and which comprises a rotatable shaft situated in the casing, where the sensor comprises a revolution counter sensor for measuring the revolutions of the shaft and also a temperature sensor for measuring the temperature of the fluid.

DESCRIPTION OF THE RELATED ART

Sensors of the above stated type are present amongst others in a gearbox for a motor vehicle. A gearbox for a motor vehicle comprises a number of shafts on which gear wheels are mounted. The shafts and the gear wheels are surrounded by a gearbox casing which is partly filled with oil. In order to monitor the number of revolutions of the engine of the vehicle a revolution counter sensor is arranged in a hole in the wall of the gearbox casing. The revolution counter sensor is, for example, designed as an induction sensor which cooperates with a toothed or pulse wheel which is arranged, for example, on the input shaft in the gearbox. For manufacturing reasons the revolution counter sensor is placed in the upper part of the gearbox, above the oil level. In order to measure the temperature of the oil a temperature sensor is arranged in a hole in the wall of the gearbox casing. The temperature sensor is usually provided with a thermoelement which is in contact with the oil. Cables are connected to the revolution counter resp. temperature sensor which lead to an indicator, such as a meter or a lamp on the instrument panel of the vehicle.

In this prior art, a hole for the revolution counter sensor and another hole for the temperature sensor must be formed in the wall of the gearbox casing. At the same time, a cable must be connected to the revolution counter sensor and another cable connected to the temperature sensor. This involves quite a number of parts which lead to increased manufacturing and mounting costs.

A problem with this prior art is that the temperature sensor must be surrounded by the oil, the temperature of which is to be determined, wherefore the temperature sensor is placed under the surface of the oil while at the same time the revolution counter sensor for manufacturing reasons must be placed above the surface of the fluid.

In order to protect the temperature sensor from splashes and stones flying up from the road the outer parts of the temperature sensor are in general placed on the upper side of the gearbox casing, or alternatively on one of its sides, because the underside of the casing is too exposed. Because the temperature sensor according to the prior art must be immersed under the surface of the oil, the sensor is unnecessarily long and often requires to be protected from vibrations, which leads to increased costs.

SUMMARY OF THE RELATED ART

The object of the invention is to provide a sensor arranged in a casing of the type mentioned in the introduction, which eliminates the above mentioned disadvantages during monitoring of the speed of rotation of a shaft and the temperature of the fluid inside a casing.

This is achieved according to the invention through the first sensor and the second sensor forming a unit which is situated in the casing and above the surface of the fluid.

With such a solution a single sensor unit is obtained which is well protected against, for example, stones flying up from the road, where earlier two sensors were required, where at least one of them often was insufficiently protected on the underside of the casing. Furthermore, only one hole is required in the wall of the casing which leads to a simpler and less expensive mounting. The wiring is also simplified as only one cable is required to be connected to the unit, as opposed to the two required earlier.

BRIEF DESCRIPTION OF THE DRAWINGS

The invention will be described more closely below with reference to the appended drawings showing examples of embodiments, where.

DESCRIPTION OF THE PREFERRED EMBODIMENT

Figure 1:
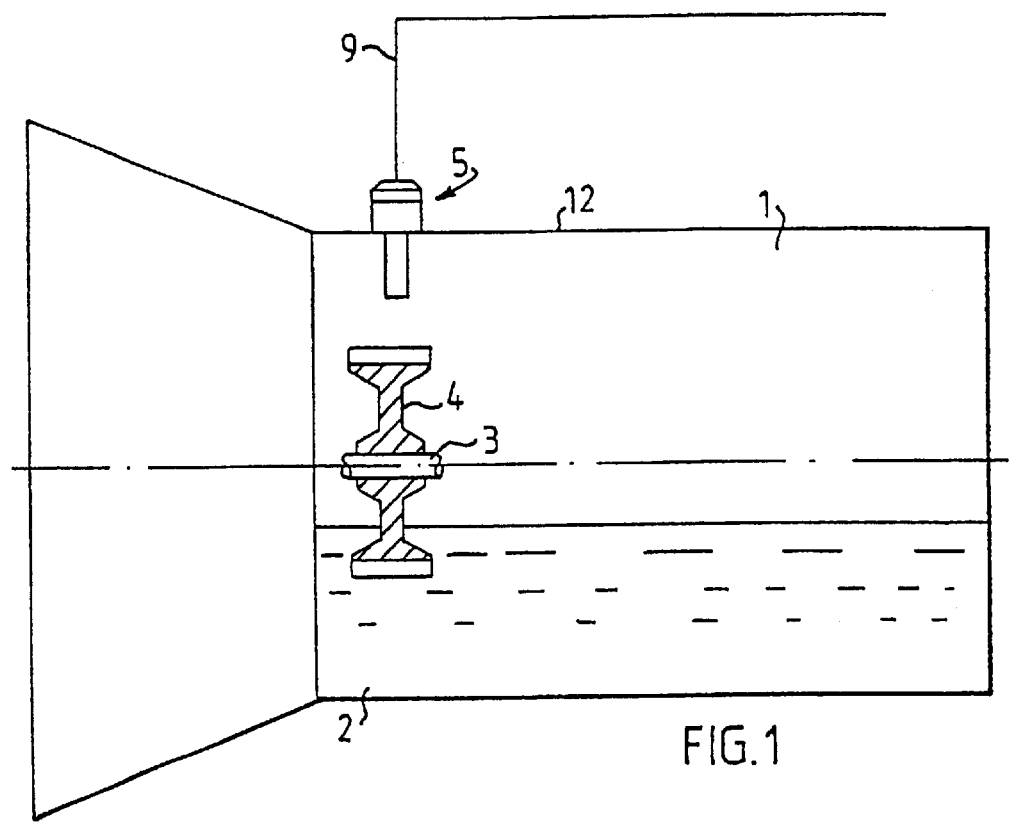
FIG. 1 shows a schematic view of a gearbox for a motor vehicle according to a first embodiment.

In FIG. 1 the number 1 denotes a housing for a gearbox which is partly filled with fluid 2 in the form of oil. Above the surface of the oil 2 there is an air volume contained in the gearbox housing 1. Inside the gearbox housing 1 a rotatable shaft 3, shown schematically, is arranged which supports a gear wheel 4. A part of the gear wheel 4 is immersed in the oil 2, which means that the teeth of the gear wheel 4 are lubricated when the gear wheel 4 rotates. A unit 5, which comprises a revolution counter sensor 6 and a temperature sensor 7, is arranged above the surface of the oil 2. According to the embodiment which is shown in FIG. 1, the unit 5 is arranged above the gear wheel 4, which by means of its teeth gives pulses to the revolution counter sensor arranged in the unit 5 when the gear wheel 4 rotates. The revolution counter sensor 6 is consequently, according to the embodiment shown, of the induction type. A cable 9 connected to the unit 5 leads the signals to instruments on the instrument panel of the vehicle.

When the gear wheel 4 rotates, it carries with it the oil 2, which due to centrifugal force partially leaves the gear wheel 4. The oil 2 will therefore splash on the unit 5 so that the temperature sensor 7 arranged on the unit 5 will come into contact with the oil 2. The oil flow which splashes onto the unit 5 can be intermittent or continuous.

With an intermittent flow the temperature which is sensed by the temperature sensor 7 of the unit 5 can be less than the actual temperature of the oil 2 because the oil 2 which splashes on the unit 5 is cooled on its path through the air in the gearbox casing 1 or because only a small volume of oil 2 hits the unit 5. In order to compensate for this lower temperature which is sensed by the unit 5, the temperature sensor 7 of the unit 5 can be pre-set with a fixed compensation value.

Figure 2:
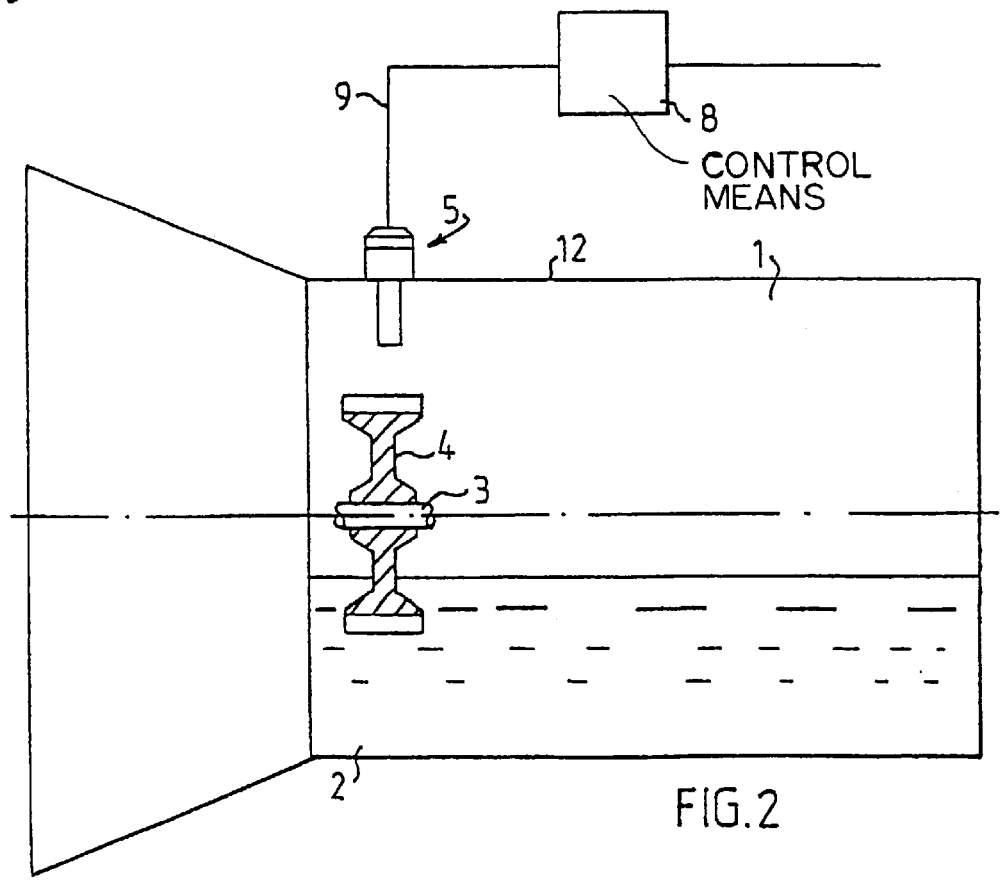
FIG. 2 shows a schematic view of a gearbox according to a second embodiment.

In order to compensate for a temperature which differs from the actual temperature, which is sensed by the unit 5, as shown in FIG. 2 a control means 8 can be connected to the unit 5 with a cable 9. The control means 8 can, for example, multiply the value measured by the unit 5 by a factor which is dependent on the speed of rotation and load on the engine of the vehicle.

Figure 3:
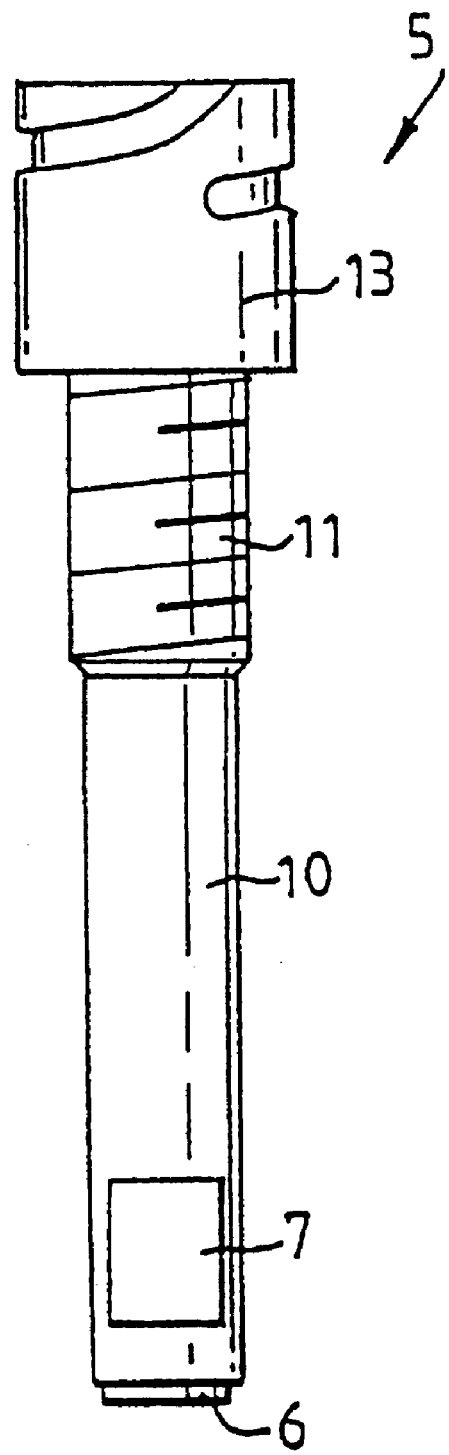
FIG. 3 shows a view of a unit according to the invention with a temperature sensor and a revolution counter sensor.

FIG. 3 shows in detail a preferred embodiment of the unit 5, which comprises a rod-shaped element 10 which on a first end has a revolution counter 6. The revolution counter 6 can be of the inductive type and comprise a magnet which is surrounded by a spool (not shown). At the first end there is also arranged a temperature sensor 7 which can be formed from a thermoelement. The temperature sensor 7 is preferably arranged on the surface of the rod-shaped element 10. At the other end of the element 10 there is a fastening means 11 in the shape of a thread. By means of the fastening means 11, the unit 5 can be screwed into a threaded hole in the wall 12 of the casing 1. The other end of the element 10 is provided with a connector 13 to which the cable 9 can be connected.

A preferred embodiment of a gearbox casing for a motor vehicle has been described above. The casing according to the invention can naturally be formed by another component in the drive line of a vehicle, such as the crankcase in an internal combustion engine or a differential gearcasing between the gearbox and the drive shaft of the vehicle.

What is claimed is:

1. Sensor arranged in a casing, which is partly filled with a fluid (2) and which comprises a rotatable shaft (3) situated in the casing (1), where the sensor comprises a revolution counter sensor (6) in order to measure the speed of rotation of the shaft (3), and on the other hand a temperature sensor (7) in order to measure the temperature of the fluid (2), characterized in that the revolution counter sensor (6) and the temperature sensor (7) form a unit (5) which is situated in the casing (1) and above the surface of the fluid (2).

2. Sensor according to claim 1, characterized in that the unit (5) is arranged in a hole in an outer wall (12) of the casing (1).

3. Sensor according to claim 2, characterized in that the temperature sensor (7) measures the oil temperature in an oil mist, which is formed through splash or spray lubrication.

4. Sensor according to claim 2, characterized in that the unit (5) is connected to a control means (8) which compensates for a differing temperature which the temperature sensor (7) senses, so that the actual temperature of the fluid (2) is measured.

5. Sensor according claim 1, characterized in that the temperature sensor (7) measures the oil temperature in an oil mist, which is formed through splash or spray lubrication.

6. Sensor according to claim 5, characterized in that the unit (5) is connected to a control means (8) which compensates for a differing temperature which the temperature sensor (7) senses, so that the actual temperature of the fluid (2) is measured.

7. Sensor according to claim 1, characterized in that the unit (5) is connected to a control means (8) which compensates for a differing temperature which the temperature sensor (7) senses, so that the actual temperature of the fluid (2) is measured.

8. Sensor according to claim 7, characterized in that the casing (1) forms a component in a drive line for a motor vehicle and that the fluid (2) is oil.

9. Sensor according to claim 8, wherein said component is the crankshaft and an internal combustion engine, the casing of a gearbox, or a differential gear casing.

10. Sensor according to claim 1, characterized in that the casing (1) forms a component in a drive line for a motor vehicle and that the fluid (2) is oil.

11. Sensor according to claim 10, wherein said component is the crankshaft and an internal combustion engine, the casing of a gearbox, or a differential gear casing.

12. Sensor according to claim 1, characterized in that the rotatable shaft (3) is provided with teeth or cogs.

13. Sensor according to claim 1, characterized in that the rotatable shaft is provided with a gear wheel.

\* \* \* \* \*